United States Patent [19]
Fortney et al.

[11] Patent Number: 5,848,474
[45] Date of Patent: Dec. 15, 1998

[54] SAW BLADE CLAMPING ARRANGEMENT FOR A POWER TOOL

[75] Inventors: Jodi Fortney, Fayetteville, N.C.; Hayden Huang, Somerville, Mass.; Kevan Kudo, Baltimore, Md.

[73] Assignee: Black & Decker Inc., Newark, Del.

[21] Appl. No.: 862,862

[22] Filed: May 23, 1997

Related U.S. Application Data

[60] Provisional application No. 60/018,200 May 23, 1995.

[51] Int. Cl.⁶ .................................................. B27B 19/02
[52] U.S. Cl. .................................. 30/392; 30/338; 279/97
[58] Field of Search ........................... 30/392, 329, 332, 30/337, 339, 338; 279/86, 97

[56] References Cited

U.S. PATENT DOCUMENTS

| | | | |
|---|---|---|---|
| 1,512,781 | 10/1924 | Masland | 30/392 |
| 1,578,475 | 3/1926 | Sideman . | |
| 2,101,362 | 3/1937 | Davidson . | |
| 2,539,574 | 1/1951 | Fulmer | 30/338 |
| 3,542,097 | 11/1970 | Dubek . | |
| 3,555,678 | 1/1971 | Agulnick | 30/166 |
| 3,738,003 | 6/1973 | Dietzen et al. | 30/392 |
| 3,823,473 | 7/1974 | Hoffman | 30/338 |
| 4,020,555 | 5/1977 | Hedrick | 30/392 |
| 4,106,181 | 8/1978 | Mattchen | 29/450 |
| 4,294,013 | 10/1981 | Krieg | 30/392 |
| 4,441,255 | 4/1984 | Hoffman | 30/392 |
| 4,470,196 | 9/1984 | Hoffman | 30/392 |
| 4,528,753 | 7/1985 | Kuhlman | 30/392 |
| 4,594,781 | 6/1986 | Hoffman | 30/392 |
| 4,601,477 | 7/1986 | Barrett et al. | 279/30 |
| 4,648,182 | 3/1987 | Hoffman | 30/392 |
| 5,103,565 | 4/1992 | Holzer, Jr. | 30/392 |
| 5,165,173 | 11/1992 | Miller | 30/392 |
| 5,263,972 | 11/1993 | Evans et al. | 606/176 |
| 5,306,025 | 4/1994 | Langhoff | 279/90 |
| 5,322,302 | 6/1994 | Quirijnen | 279/22 |
| 5,324,052 | 6/1994 | Ortmann | 279/83 |
| 5,443,276 | 8/1995 | Nasser et al. | 279/77 |
| 5,458,346 | 10/1995 | Briggs | 279/77 |
| 5,487,221 | 1/1996 | Oda et al. | 30/392 |
| 5,575,071 | 11/1996 | Phillips et al. | 30/392 |
| 5,615,746 | 4/1997 | Chu | 30/392 |
| 5,647,133 | 7/1997 | Dassoulas | 30/392 |

FOREIGN PATENT DOCUMENTS 195 43 247 11/1995 Germany .
WO 95/27583 10/1995 WIPO .

Primary Examiner—Hwei-Siu Payer
Attorney, Agent, or Firm—Harness, Dickey & Pierce, P.L.C.

[57] ABSTRACT

A saw blade clamping arrangement particularly for power reciprocating saws and similar tools having a reciprocating drive shaft connected to a cutting member such as a saw blade includes a clamping member movable relative to the drive shaft between a clamped position and a release position. A threaded fastener passes through an aperture formed in a portion of the clamping member and functions to move the clamping member to its clamped position upon selective rotation. A sleeve surrounds the threaded fastener for rotation therewith. When the sleeve is biased against the clamping member through the force of a biasing member, opposing surfaces prevent rotation of the sleeve.

18 Claims, 3 Drawing Sheets

SAW BLADE CLAMPING ARRANGEMENT FOR A POWER TOOL

CROSS-REFERENCE TO RELATED APPLICATION

This application is a conventional application based on a provisional application filed May 23, 1996 and assigned U.S. Ser. No. 60/018,200

BACKGROUND OF THE INVENTION

1. Field of the Invention

The present invention relates generally to power tools. In particular, the present invention relates to a saw blade clamping arrangement for a power tool having a cutting member removably mounted to a reciprocating drive shaft.

2. Discussion

Power reciprocating saws include jigsaws and other reciprocating saws often referred to in the trade as "recip" saws. These saws incorporate reciprocating drive shafts for driving generally linear saw blades along a rectilinear path to produce a cutting action. In a conventional manner, the saw blades used with such power tools are attached to the reciprocating drive shafts through a blade holder having a slot for receiving the saw blade and a set screw which is received in a hole in the blade. Tightening of the set screw functions to clamp the blade in place relative to the reciprocating drive shaft. While this manner of saw blade attachment has long proven to be generally satisfactory and commercially successful, it is not without associated disadvantages and is therefore subject to improvement.

The primary disadvantage inherently associated with set screw arrangements is attributable to the significant amount of vibrational forces from the cutting action of power reciprocating saws during operation. These vibrational forces frequently result in loosening of the set screw. If the set screw does not remain sufficiently tightened, the saw blade will not remain properly secured to the drive shaft, thereby adversely effecting tool performance and possibly resulting in complete disengagement of the saw blade from the drive shaft. An additional disadvantage with the conventional mounting of saw blades to reciprocating drive shafts relates to an inability to quickly and easily remove saw blades which from time to time become worn or fractured. Because it is often desirable to cut a workpiece with minimum material loss, it is correspondingly desirable to minimize the thickness of the saw blade. As a result, breakage due to the forces encountered during typical use is not an uncommon occurrence. This potential frequency of blade changing makes the ease and rapidity of such action a highly desirable feature for reciprocating saws. A further disadvantage of conventional blade mounting arrangements is the necessity for a separate tool such as a wrench for fixation and removal of the saw blade. These tools are frequently misplaced and time consuming to use. Furthermore, such tools typically require two-handed operation.

Various prior attempts have been made to overcome the disadvantages associated with the above-described conventional mounting of saw blades. Many of such prior attempts are directed to the elimination of the use of a set screw. One example of such a saw blade mounting arrangement is shown and described in U.S. Pat. No. 5,322,302. The saw blade mounting arrangement taught by U.S. Pat. No. 5,322,302 includes a mounting body which functions to urge a clamping sphere through the biasing force of a spring into clamping engagement with a saw blade. Removal of the saw blade is facilitated through actuation of a lever which is selectively operable for overcoming the biasing force exerted by the spring. Operation of this device requires a first of the operator's hands to actuate the lever and a second of the operator's hands for removal or installation of the saw blade. In other words, the actuating lever of this device is not movable to a stable, non-clamping position and necessarily requires two-handed operation—an action which is not always practical or convenient.

Other previous attempts to secure saw blades to a reciprocating drive shaft of a power tool without the conventional use of a set screw are shown in U.S. Pat. Nos. 3,542,097; 3,823,473; 4,020,555; 4,106,181; 4,441,255; 4,594,781; 4,470,196; 4,528,753; 4,601,477; 4,648,182; 5,103,565; 5,263,972; and 5,324,052.

In general, each of the devices taught in these patents represents an attempt to overcome one or more of the disadvantages associated with conventional set screw attachment of a saw blade to a reciprocating drive shaft, including but not limited to the disadvantages discussed above. However, all of these devices are subject to further refinement and improvement. For example, many of the devices, including U.S. Pat. No. 5,322,302 discussed above, disadvantageously require two-handed operation. Additionally, by eliminating the set screw, most of the devices disclosed in the above-noted patents are complicated and expensive both to manufacture and assemble as a result of a construction including many separate parts. Furthermore, operation of many of the prior devices requires application of force which is often significant for securing the saw blade in place and loosening of the blade for separation from the drive shaft. Attaining a sufficient force to secure the saw blade to the reciprocating drive shaft often requires the use of a wrench or other tool. Among other disadvantages associated with these noted prior devices is an inability to releasably attach conventionally shaped saw blades to the reciprocating drive shaft.

The present invention comprises an improvement over prior known blade mounting arrangements for power tools, including those disclosed in the aforementioned patents. More particularly, the present invention provides a new and improved saw blade mounting arrangement for a power reciprocating saw which retains the known advantages of prior set screw arrangements (e.g., quick and easy operation, and relatively low manufacturing and assembly costs) while eliminating associated disadvantages.

In the preferred embodiment, linear advancement of a threaded fastener operates to move a clamping member between a clamped position and a release position. Further in the preferred embodiment, a sleeve surrounds the threaded fastener which cooperates with the clamping member to prevent loosening of the threaded fastener. The sleeve also provides a mechanical advantage for tightening the threaded fastener.

Advantageously, the present invention provides a power reciprocating saw in which the saw blade can be mounted in place and detached using only a single hand. Additionally, the present invention provides a saw blade mounting arrangement for a power reciprocating saw of simple construction which is relatively inexpensive to manufacture and assemble. Furthermore, the present invention provides a blade mounting arrangement which can accommodate conventional saw blades of various constructions and which can hold the saw blade in place without the need to employ any other form of a tool.

In one form, the present invention provides a saw blade clamping arrangement for a power tool of the type including a housing, a drive shaft mounted for reciprocating motion relative to the housing, and a saw blade releasably interconnected with the drive shaft. The saw blade clamping arrangement includes a clamping member at least surrounding the shaft and the saw blade. The clamping member is movable relative to the drive shaft between a clamped position for securing the saw blade adjacent to the drive shaft and a release position in which the saw blade may be separated from the drive shaft. The saw blade clamping arrangement additionally includes a threaded fastener located at least partially within an internally threaded aperture formed in the clamping member. The threaded fastener is selectively operable for establishing a clamping force between the saw blade and the drive shaft.

In a preferred form, the present invention provides a power reciprocating saw having a housing and a drive shaft interconnected to the housing for reciprocating motion relative to the housing. A saw blade having a haft is releasably interconnected to a distal end of the drive shaft for cutting movement along a longitudinal axis. The power reciprocating saw further includes a clamping arrangement for releasably and securely mounting the saw blade to the drive shaft. The arrangement includes a clamping body which is movable relative to the drive shaft between a clamped position for securing the saw blade adjacent to the drive shaft and the release position in which the saw blade may be separated from the drive shaft. A threaded fastener having a head engages an aperture which passes through a portion of the clamping body. A sleeve defining a channel and surrounding the threaded fastener cooperates with the head of the threaded fastener for preventing rotation of the sleeve relative to the threaded fastener. A biasing member is disposed in the channel and is operative for providing a biasing force to bias the sleeve against the clamping body.

BRIEF DESCRIPTION OF THE DRAWINGS

Additional objects and advantages of the present invention will become apparent from a reading of the following detailed description of the preferred embodiment which makes reference to the drawings of which.

DETAILED DESCRIPTION OF THE PREFERRED EMBODIMENT

As required, a detailed embodiment of the present invention is disclosed herein. However, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

The present invention provides an improved saw blade clamping arrangement for a power tool. As illustrated throughout the drawings, the exemplary embodiment of the saw blade clamping arrangement is specifically adapted for a reciprocating power saw. However, those skilled in the art will appreciate that the present invention is not so limited in scope or application. In this regard, the teachings of the present invention will be understood to be readily adaptable for use with any tool incorporating a reciprocating cutting members, including but not limited to reciprocating saws, jig saws, various surgical saws, culinary knives, and related tools whether drawn by power or not.

Figure 1:
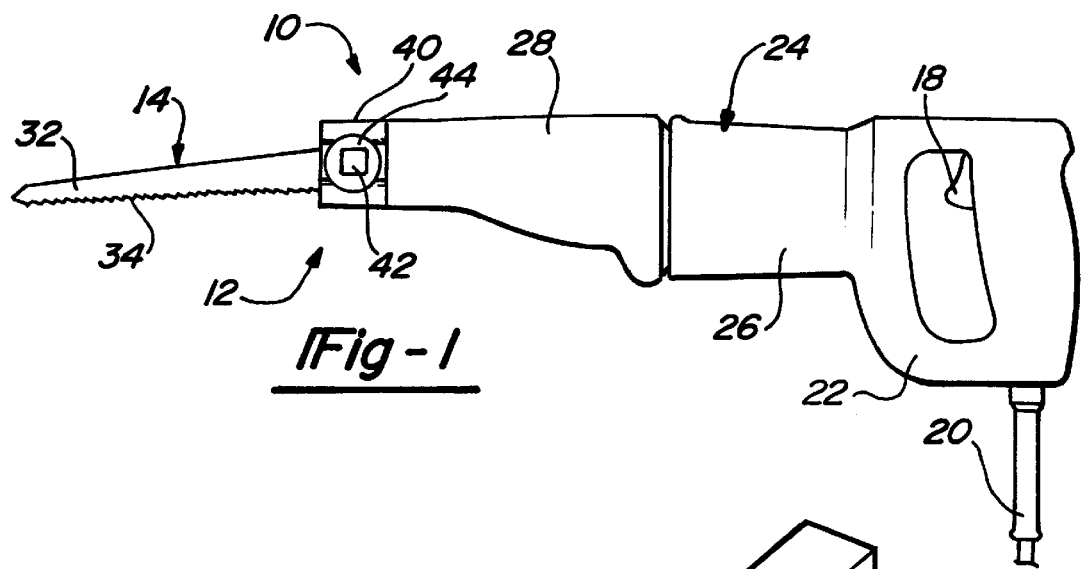
FIG. 1 is a side elevational view of a reciprocating saw incorporating a saw blade clamping arrangement constructed in accordance with the teachings of the preferred embodiment of the present invention.
Figure 2:
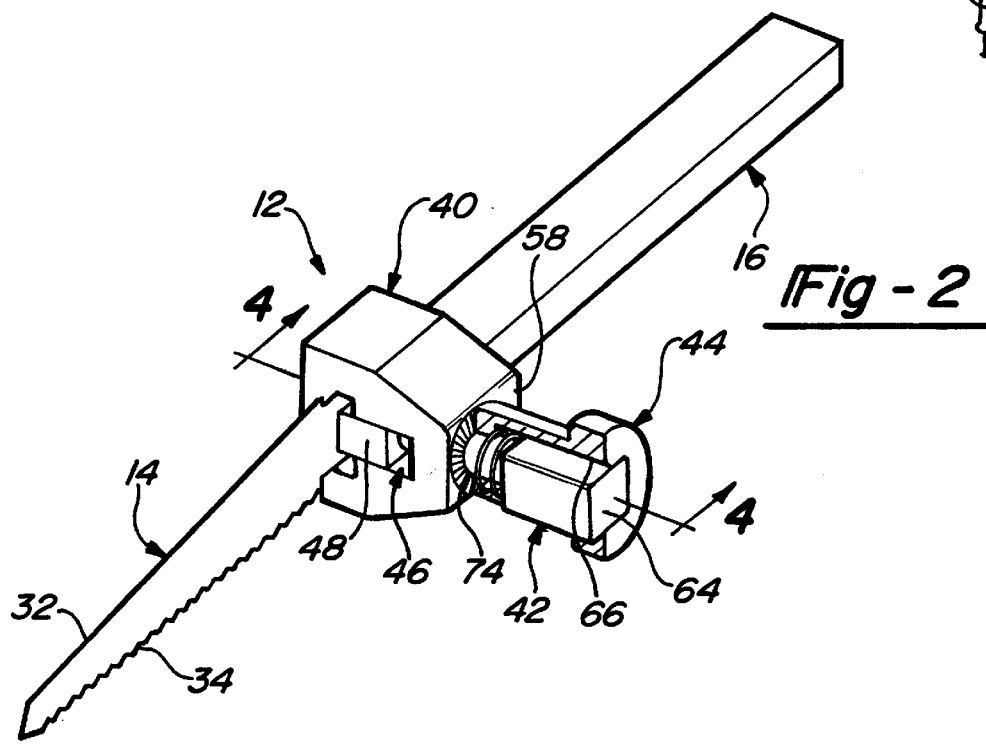
FIG. 2 is an enlarged, partially cut-away perspective view of the saw blade clamping arrangement of the present invention shown in FIG. 1.

Turning now to the drawings in which identical or equivalent elements have been identified with like reference numerals, an exemplary power tool embodying the teachings of the present invention is illustrated in FIG. 1 as a power reciprocating saw and is identified generally at reference numeral 10. Much of the focus of the present invention is directed to a saw blade clamping arrangement 12 which operatively and releasably attaches a saw blade 14 to reciprocating drive shaft 16 of the tool 10.

Prior to addressing the structural and function features of the saw blade clamping arrangement 12, a brief understanding of the exemplary power tool 10 is warranted. In a conventional manner, the power reciprocating saw 10 is powered by a motor (not shown) that is actuated by a trigger switch 18. The delivery of electrical energy to the motor through a power cord (partially shown at 20) is controlled by trigger switch 18. Power tool 10 is shown to include a handle portion 22 which carries trigger switch 18. Power tool 10 is also shown to include a housing 24 that includes a centrally located motor housing portion 26 and a forwardly located gear case housing portion 28. The drive shaft 16 partially extends from a drive shaft channel (not shown) and is operatively connected with a drive mechanism (not shown) housed within gear case housing portion 28. This interconnection between the drive mechanism and drive shaft 16 can be in any manner well known in the art. The drive shaft 16 is mounted for reciprocating motion generally along the longitudinal axis defined by power tool 10.

Figure 3:
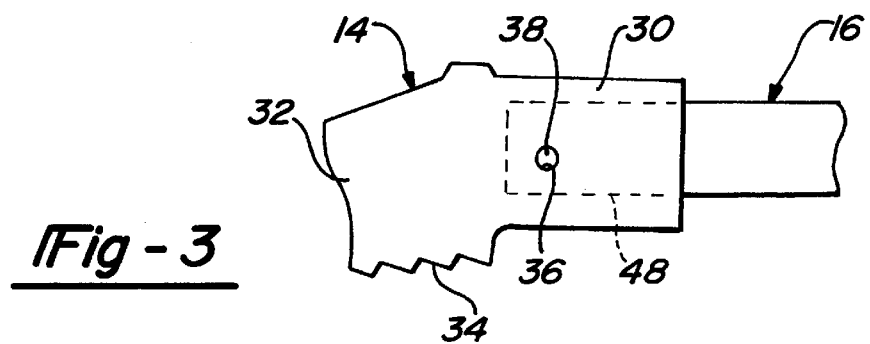
FIG. 3 is a side view of the saw blade and drive shaft of FIG. 2 shown apart from the saw blade clamping arrangement in order to illustrate the cooperating feature therebetween.

As shown in FIG. 3, the exemplary saw blade 14 illustrated throughout the drawings is of conventional construction. Significantly and as will become apparent below, the saw blade clamping arrangement 12 of the present invention does depend upon a saw blade 14 having a particular configuration. In this regard, the saw blade clamping arrangement 12 of the present invention may be readily adapted to releasably attach any known saw blade to the reciprocating drive shaft. The saw blade 14 shown includes a generally rectangular shaft portion 30 and a forwardly extending cutting portion 32 integrally formed therewith and including a plurality of cutting teeth 34. The haft portion 30 includes an aperture 36 for receiving a generally cylindrical locating pin 38 extending from the reciprocating drive shaft 16 and disposed generally perpendicular to the longitudinal axis of the reciprocating drive shaft 16.

Referring now generally to FIGS. 1, 2, and 4–6, the saw blade clamping arrangement 12 of the present invention is shown to generally include a clamping member or body 40. The saw blade clamping arrangement 12 further includes a threaded fastener 42 and a retractable sleeve 44 surrounding the threaded fastener 42. The clamping member 40 is formed to define a generally T-shaped channel 46 adapted to at least partially receive a distal end 48 of the reciprocating drive shaft 16 and the haft portion 30 of the saw blade 14.

Figure 4:
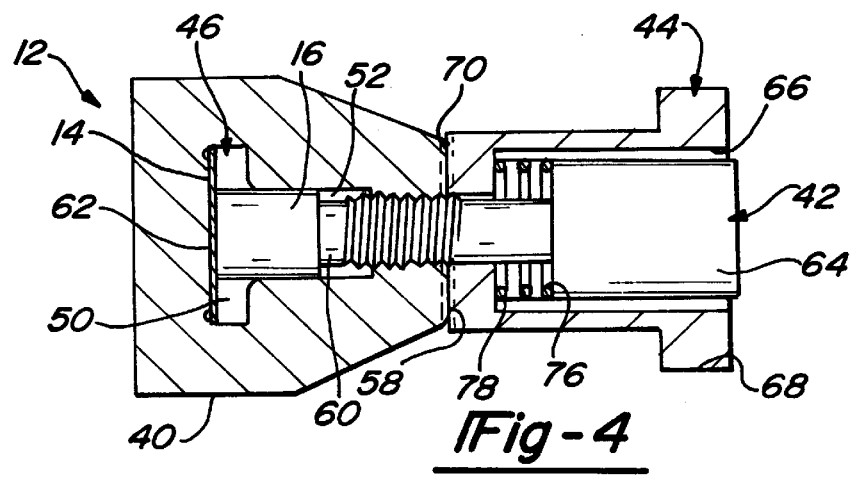
FIG. 4 is a cross-sectional view taken along the line 4—4 of FIG. 2, illustrating the clamping arrangement in its clamped position securely retaining the saw blade adjacent the drive shaft.
Figure 5:
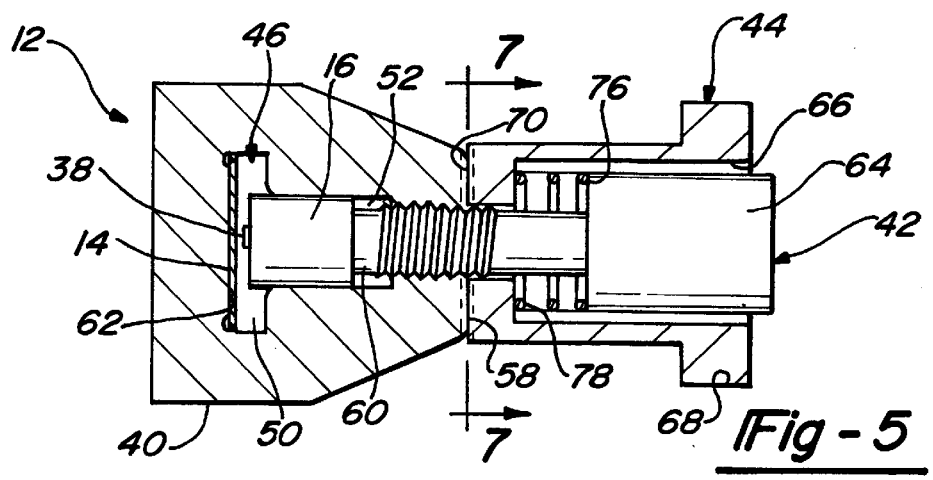
FIG. 5 is a cross-sectional view similar to FIG. 4, but illustrating the clamping arrangement in its release position in which the blade may be removed from adjacent the drive shaft for replacement.
Figure 6:
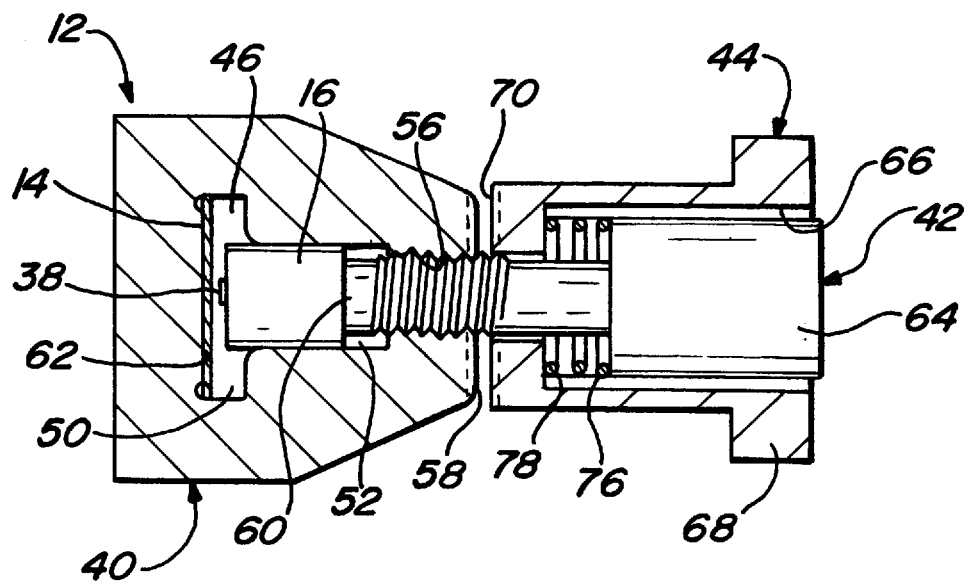
FIG. 6 is another cross-sectional similar to FIG. 4, but illustrating the sleeve retracted against the biasing force of the spring and away from the clamping member so as to permit concurrent rotation of the sleeve and the threaded fastener.

As shown most clearly in the cross-sectional views of FIGS. 4 through 6, a first portion 50 of the T-shaped channel 46 receives the haft portion 30 of the saw blade 14 and a second portion 52 of the T-shaped channel 46 which is oriented perpendicular to the first portion 50 receives the distal end 48 of the reciprocating drive shaft 16. The height of the first portion 50 is closely toleranced to the height of the haft portion 30 of the saw blade 14 so that rotation of saw blade 14 about the locating pin 38 is substantially precluded. Similarly, the height of the second portion 52 is closely toleranced to a corresponding dimension of the distal end 48 of the drive shaft 16.

The distal end 48 of the drive shaft 16 is movable within the T-shaped channel 46 between a first position (shown in FIG. 4) and a second position (shown in FIG. 5). In the first position, the clamping member 40 abuts saw blade 14. When the distal end 48 of the drive shaft 16 is moved to the second position, the saw blade 14 is permitted to be removed from the T-shaped channel 46 and replaced.

The threaded fastener 42 of the saw blade clamping arrangement 12 of the present invention is located partially within and extends through an internally threaded aperture 56 formed in a portion of the clamping member 40. The aperture 56 is located in a side 58 of the clamping member 40 which is positioned adjacent the sleeve 44 and extends through the clamping member 40 to the T-shaped channel 46. Selective rotation of the threaded fastener 42 results in corresponding linear movement of the threaded fastener 42 toward or away from the reciprocating drive shaft 16. Specifically, upon clockwise rotation of the threaded fastener 42, a first end 60 of the threaded fastener 42 engages the reciprocating drive shaft 16 and forcibly displaces the reciprocating drive shaft 16 against the saw blade 14. As a result, the locating pin 38 on the reciprocating drive shaft 16 engages the aperture 36 located in the haft portion 30 of the saw blade 14, thereby preventing removal of the saw blade 14 from its operative position adjacent the reciprocating drive shaft 16. The clamping force applied to the saw blade 14 by the reciprocating drive shaft 16 is opposed by an abutting interior surface 62 of the clamping member 40. In the embodiment illustrated, the first end 60 of the threaded fastener 42 is not joined for motion with the drive shaft 16. However, in certain applications, such an arrangement may be desirable. For purposes which will become apparent immediately below, the threaded fastener 42 includes a generally rectangular head 64.

The sleeve 44 of the saw blade clamping arrangement 12 of the present invention circumferentially surrounds the rectangular head 64 of threaded fastener 42. As such, the sleeve 44 defines a generally rectangular channel 66 roughly corresponding in size to the head 64 of the threaded fastener to thereby prevent rotation of the head 64 relative to the sleeve 44. The sleeve 44 is formed to include a radially enlarged first end 68 which provides a mechanical advantage for rotating the threaded fastener 42.

Figure 7:
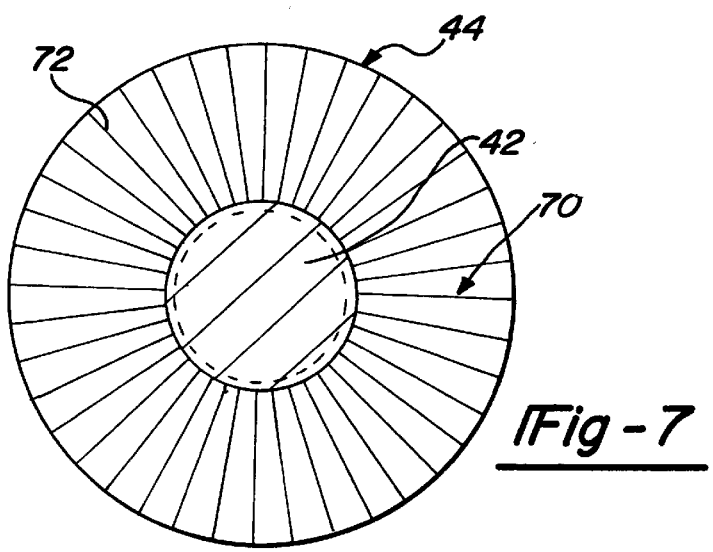
FIG. 7 is an enlarged side view of the surface of the clamping member adjacent the sleeve illustrating the locking teeth formed thereon which cooperate with substantially identical locating teeth on the sleeve to prevent the threaded fastener from unintentionally backing out.

A surface 70 of the sleeve 44 cooperates with the side 58 of the clamping member 40 to prevent rotation of the sleeve 44 when the sleeve 44 abuts the clamping member 40. In this regard, the side 58 of the clamping member 40 and the surface 70 of the sleeve 44 are formed to include cooperating engagement members. As shown in the cross-sectional view of FIG. 7, the cooperating engagement members located on the surface 70 of the sleeve 44 preferably comprises a plurality of radially spaced teeth 72. While not specifically shown, a substantially identical plurality of radially spaced teeth 74 (shown in FIG. 2) is formed on the side 58 of the clamping member 40.

A biasing member 76 is disposed within the channel 66 and functions to exert a force for biasing the sleeve 44 into engagement with the clamping member 40. The spring 76 surrounds a portion of the threaded fastener 42 and is located interbetween the head 64 of the threaded fastener 42 and an internal flange 78 of the sleeve 44. Rotation of the threaded fastener 42 relative to the clamping body 40 requires retraction of the sleeve 44 in a direction away from the clamping body 40. Once the surface 70 of the sleeve 44 and the side 58 of the clamping member 40 are spaced apart (as shown in FIG. 6), the threaded fastener 42 can be rotated through corresponding rotation of the sleeve 44.

With particular reference to FIGS. 4–6, the operation of the clamping arrangement 12 of the present invention heretofore detailed will now be described. Beginning with saw blade 14 securely and operatively interconnected to the reciprocating drive shaft 16 as shown in FIG. 4, inadvertent loosening of the threaded fastener 42 from the vibrational forces generated by the tool 10 is opposed by the cooperating pluralities of teeth 72 and 74 formed on the surface 70 of the sleeve 44 and the side 58 of adjacent clamping member 40, respectively. Selective rotation of the sleeve 44 correspondingly rotates the threaded fastener 42, thereby causing the first end 60 of the threaded fastener 42 to be displaced from the reciprocating drive shaft 16. At this point, the reciprocating drive shaft 16 can be translated to its release position within the channel 46 (as shown in FIG. 5) and the blade 14 can be removed from the channel 46. Once the saw blade 14 is replaced, rotation of the sleeve 44 in the opposite direct linearly advances the first end 60 of the threaded fastener 42 into engagement with the reciprocating drive shaft 16. As a result, the reciprocating drive shaft 16 is advanced to its clamped position within the channel 46 adjacent the saw blade 14 and a clamping force is created by pressing of the saw blade 14 against the opposing surface 62 of the clamping body 40.

While the above description constitutes the preferred embodiment of the invention, it will be appreciated that the invention is susceptible to modification, variation, and change without departing from the proper scope or fair meaning of the accompanying claims.

What is claimed is:

1. A power reciprocating saw comprising:

a housing;

a drive shaft interconnected to the housing for reciprocating motion relative to said housing;

a saw blade having a haft releasably interconnected to a distal end of said drive shaft for cutting movement along a longitudinal axis; and a clamping arrangement for releasably and securely mounting said saw blade to said drive shaft, said clamping arrangement including:
   a clamping body at least partially surrounding said drive shaft and said saw blade, said drive shaft movable relative to said clamping body between a clamped position for securing said saw blade adjacent to said drive shaft and a release position in which said saw blade may be separated from said drive shaft;
   a threaded fastener having a head, said threaded fastener engaging an aperture which passes through a portion of said clamping body;
   a sleeve defining a channel and surrounding said threaded fastener, said sleeve cooperating with said head of said threaded fastener for preventing rotation of said sleeve relative to said threaded fastener; and
   a biasing member disposed in said channel and operative for providing a biasing force to bias said sleeve against said clamping body.

2. The power reciprocating saw of claim 1 further comprising first and second cooperating engagement members located on adjacent surfaces of said sleeve and said clamping body, said first and second cooperating engagement members operative to prevent rotation of said sleeve when said sleeve abuts said clamping body.

3. The power reciprocating saw of claim 1, wherein said sleeve retractable against said biasing force and away from said clamping body for permitting concurrent rotation of said threaded fastener and said sleeve.

4. The power reciprocating saw of claim 1, wherein said clamping body defines a central channel for receiving said haft of said saw blade and said distal end of said drive shaft, said threaded fastener partially extending into said central channel.

5. A saw blade clamping arrangement for a power tool of the type including a housing, a drive shaft mounted for reciprocating motion relative to the housing, and a saw blade having a haft releasably interconnected with a distal end of the drive shaft for rectilinear motion along a cutting axis, the saw blade clamping arrangement comprising:
   a clamping member at least partially surrounding the drive shaft and the saw blade, said drive shaft movable relative to the clamping member between a clamped position for securing the saw blade adjacent to the drive shaft and a release position in which the saw blade may be separated from the drive shaft, said clamping member including an internally threaded aperture; and
   a threaded fastener located at least partially within said internally threaded aperture of said clamping member, said threaded fastener operative for selectively establishing a clamping force between the drive shaft and the saw blade.

6. The saw blade clamping arrangement for a power tool of claim 5, wherein said threaded fastener includes a first end adapted to force one of the saw blade and the drive shaft against the other of the saw blade and the drive shaft when rotated in a first direction.

7. The saw blade clamping arrangement for a power tool of claim 6, wherein said clamping member defines a central channel for receiving the haft of the saw blade and the distal end of the drive shaft, said threaded fastener partially extending into said central channel.

8. The saw blade clamping arrangement for a power tool of claim 5, further comprising a sleeve surrounding said threaded fastener, said sleeve defining a longitudinally extending cavity which cooperates with a head of said threaded fastener to prevent relative rotation between said threaded fastener and said sleeve.

9. The saw blade clamping arrangement for a power tool of claim 8, further comprising a biasing member for providing a biasing force to bias said sleeve into engagement with said clamping member.

10. The saw blade clamping arrangement for a power tool of claim 9, wherein said sleeve is retractable against said biasing force and away from said clamping member for permitting concurrent rotation of said threaded fastener and said sleeve.

11. The saw blade clamping arrangement for a power tool of claim 8, further comprising first and second cooperating engagement members located on adjacent surfaces of said sleeve and said clamping member, respectively, said first and second cooperating engagement members being operative to prevent rotation of said sleeve in a first direction when said sleeve abuts said clamping member.

12. A saw blade clamping arrangement for a power tool of the type including a housing, a drive shaft mounted for reciprocating motion relative to the housing, and a saw blade releasably interconnected with the drive shaft for motion along a cutting axis, the saw blade clamping arrangement comprising:
   a clamping body interconnected to the drive shaft;
   a control element interconnected to said clamping body and rotatable about an axis perpendicular to the cutting axis between first and second positions for selectively establishing a clamping force between the drive shaft and the saw blade; and
   a sleeve surrounding said control element, said sleeve operative to selectively prevent rotation of said control element.

13. The saw blade clamping arrangement for a power tool of claim 12, wherein said clamping body includes an internally threaded aperture and further wherein said control element comprises a threaded fastener at least partially extending into said internally threaded aperture.

14. The saw blade clamping arrangement for a power tool of claim 13, wherein said threaded fastener includes a first end adapted to force one of the saw blade and the drive shaft against the other of the saw blade and the drive shaft when rotated in a first direction.

15. The saw blade clamping arrangement for a power tool of claim 14, wherein said clamping body defines a central channel for receiving the saw blade and the drive shaft, said threaded fastener partially extending into said central channel.

16. The saw blade clamping arrangement for a power tool of claim 15, further comprising a biasing member for providing a biasing force to bias said sleeve into engagement with said clamping body.

17. The saw blade clamping arrangement for a power tool of claim 16, further comprising first and second cooperating engagement members located on adjacent surfaces of said sleeve and said clamping body, respectively, said first and second cooperating engagement members being operative to prevent rotation of said sleeve in a first direction when said sleeve abuts said clamping body.

18. The saw blade clamping arrangement for a power tool of claim 17, wherein said sleeve is retractable against said biasing force and away from said clamping body for permitting concurrent rotation of said threaded fastener and said sleeve.

\* \* \* \* \*